(12) United States Patent
Itzhak

(10) Patent No.: US 6,733,654 B1
(45) Date of Patent: May 11, 2004

(54) WATER TREATMENT METHOD AND APPARATUS

(75) Inventor: David Itzhak, Omer (IL)

(73) Assignee: Argad-Eyal Ltd., Atlit (IL)

( * ) Notice: Subject to any disclaimer, the term of this patent is extended or adjusted under 35 U.S.C. 154(b) by 0 days.

(21) Appl. No.: 09/656,187

(22) Filed: Sep. 6, 2000

(30) Foreign Application Priority Data

Sep. 9, 1999 (IL) .................................................. 131848

(51) Int. Cl.[7] .............................................. C02F 1/461
(52) U.S. Cl. ..................................... 205/742; 205/751
(58) Field of Search ............................... 205/742, 751; 204/274, 275.1, 276

(56) References Cited

U.S. PATENT DOCUMENTS

| | | | |
|---|---|---|---|
| 4,384,943 A | | 5/1983 | Stoner et al. |
| 4,917,782 A | * | 4/1990 | Davies .................... 205/743 |
| 4,931,187 A | | 6/1990 | Derham et al. |
| 5,013,415 A | * | 5/1991 | Hudson .................... 205/743 |
| 5,268,092 A | | 12/1993 | Eden |
| 5,424,032 A | | 6/1995 | Christensen et al. |
| 5,611,907 A | | 3/1997 | Herbst et al. |
| 6,077,445 A | | 6/2000 | Ascolese |
| 6,235,188 B1 | * | 5/2001 | Nakamura et al. .......... 205/742 |

FOREIGN PATENT DOCUMENTS

| | | |
|---|---|---|
| DE | DD 218 881 | 2/1985 |
| WO | WO 91/04229 | 4/1991 |
| WO | WO 95/03998 | 2/1995 |
| WO | WO 99/16715 | 9/1998 |

OTHER PUBLICATIONS

McManus. "Reuse of Agricultural Wasterwater for Power Plant Cooling:One–Year Pilot Plant Experience". Proceedings AWWA Annual Conference Part I. Jun. 24–29, 1997, pp. 441–455.

Fleischman. "Reuse of Wastewater Effluent as Cooling Tower Makeup Water". Proceedings of the National Conference on Complete Water Re–use. May 4–8, 1975, pp. 501–514.

* cited by examiner

Primary Examiner—Arun S. Phasge
(74) Attorney, Agent, or Firm—Merchant & Gould P.C.

(57) ABSTRACT

A method of operating a cooling tower comprises feeding to the cooling tower a make-up stream of water containing organic and/or biological contaminants, causing a side stream taken from the recirculating stream to pass through an electrolytic cell, removing solids precipitating by the action of the cell, and remixing the treated side stream with the main stream, before feeding them to the cooling tower.

6 Claims, 1 Drawing Sheet

WATER TREATMENT METHOD AND APPARATUS

FIELD OF THE INVENTION

The present invention relates to water treating systems. Particularly, the invention relates to a method and apparatus for the utilization of wastewater.

BACKGROUND OF THE INVENTION

The problem of scale is inherent to all systems in which there is a flow of water that contains any of $Ca^{++}$ and $Mg^{++}$ ions together with any of $OH^-$, $CO_3^=$, $HCO_3^-$, $SiO_3^=$, $SO_4^=$ or $PO_4^\equiv$. Under certain temperature and pH conditions, carbonates, silicates, sulfates, phosphate and hydroxide salts precipitate and cause blockage of nozzles, reduction of cross-section area of pipes, heat insulation and underdeposit corrosion. The well-known methods of removing scale from aqueous liquids are reverse osmosis and ion exchange. Another method for removing scale is direct current (DC) electrolysis. U.S. Pat. No. 4,384,943 discloses a method of fluid treatment which comprises applying DC current to aqueous liquids.

Electrolytic treatment of aqueous fluids to produce biocides is well known in the art. For example, U.S. Pat. No. 4,384,943 describes such a treatment which comprises maintaining in the fluid a compound that is electrochemically decomposable to yield bromine, chlorine or iodine and/or by decomposing water to produce biocidally active $O_2$ or $O_3$ oxidants.

U.S. Pat. No. 6,424,032 describes a method of treating water using innocuous chemicals for the treatment of microorganisms, or employing ultraviolet light or electrolysis in order to destroy microorganisms.

In a copending patent application by the same applicant hereof, WO 99/16715, the description of which is entirely incorporated herein by reference, there is described a method of treatment of aqueous media, comprising applying to said aqueous medium in an electrolytic cell an electrical direct current of a magnitude and at a flow-rate of the liquid in said electrolytic cell such that a combined effect of scale removing and disinfecting is achieved.

WO 99/16715 further provides an aqueous fluid treatment device for scale removing and disinfecting comprising an electrolytic cell operated by a direct current source, said electrolytic cell being adapted to allow an aqueous medium to circulate therethrough.

The term "disinfecting", as used herein, means destroying various types of microorganisms to the extent that this prevents the formation of biological fouling, and disinfection of drinking water or of water for use in bathing.

Since scale removing and scale preventing are related processes, each of the terms "scale removing" and "scale preventing" herein mean both scale removing and scale preventing.

However, all prior art methods and apparatus suffer from the severe drawback that they require, in order to operate, to utilize substantially non-polluted water, since the addition of impure water leads to operational problems, to high purifying chemicals demand, and to undesirable disposal of waste. Particularly undesired, according to the known art, is the use of water containing organic contaminants. Thus, essentially clean water is wasted, e.g., for operating cooling towers, while waste water from the tower and other industrial or urban sources has to be treated prior to disposal, in an expensive manner.

Cooling towers cannot use water with a high content of organic and biologic materials, since the resulting biofouling, developing as a matter of hours, initially reduces the efficiency of the tower, and eventually may lead to a clogging of the tower's fill.

It has now been surprisingly found, and this is an object of the invention, that it is possible to utilize waste water to operate cooling tower and related equipment, including high organic and biological loads, thereby obtaining the dual result of exploiting less expensive water for operation, and reducing the emission of industrial and urban wastes. For the purpose of illustrating the invention, it could be mentioned that a cooling tower operating according to invention, which utilizes a make-up of 330 $m^3$ of wastewater every day (e.g., from an industrial plant), reduces the emission of waste to a mere 30 $m^3$ a day, by employing the present invention, the remaining water being evaporated. Thus, instead of treating large volumes of diluted wastewater, only small amounts (less than 10%) of concentrated waste is to be treated. This also results in a lower demand for wastewater treatment volumes.

It is an objet of the invention to provide a method for the utilization of wastewater, which overcomes the aforementioned drawback of the prior art.

It is another object of the invention to provide apparatus, particularly cooling tower apparatus that employs impure water.

Other objects of the invention will become apparent as the description proceeds.

SUMMARY OF THE INVENTION

In one aspect the invention is directed to a method of operating a cooling tower, comprising feeding to said cooling tower a make-up stream of water containing organic and/or biological contaminants, causing a side stream taken from the recirculating stream to pass through an electrolytic cell, removing solids precipitating by the action of said cell, and remixing said treated side stream with the main stream, before feeding them to the cooling tower.

According to a preferred embodiment of the invention, the recirculating water is further oxidized by the addition of an oxidizing material. Addition of the oxidant is preferably, but non-limitatively, effected in an amount suitable to maintain the Redox potential at the inlet of the cooling tower in the range of about 300–400 mV. Ilustrative and non-limitative examples of suitable oxidants include NaClO, TCCA, BCDMH, $Br_2$ and $Cl_2$.

According to another preferred embodiment of the invention, a non-oxidizing biocide is added to the recirculating stream as an aid in the prevention of biofouling. Preferably, but non-limitatively, the biocide is added when the Redox potential decreases to a value of about 200 mV or less due to high organic load. Illustrative and non-limitative examples of suitable non-oxidizing biocides include phenolic biocides, quaternary amines, triazolin, DBNPA (dibromonitrilproprionamide), MIT (methyl izothiazolinone) or MBT (Methylene Bis Thiocyanate).

As will be appreciated by the skilled person, the COD of the make-up stream, at high COD values, is typically not less than about 600 and only at peak times reaches over 2,000 ppm. Normally, however, the COD of the make-up stream is maintained between 500 and 1000 ppm. As will be appreciated by the skilled person, the invention is not limited to CODs of 500 and above, and can of course operate at lower CODs. However, the advantages attained by the invention are even more enhanced when high CODs, or 500 or more are used, which are unheard of in the art of operating cooling towers.

According to a preferred embodiment of the invention, the Redox potential of the stream entering the cooling tower is in the range 300–400 mV.

In another aspect the invention is directed to a cooling tower system comprising, in combination with suitable inlets and outlets:

a cooling tower;

a heat-exchanger;

an electrolytic cell; and at least one filter.

In a further aspect, the invention is directed to a method for concentrating waste water, comprising feeding said waste water to a cooling tower, causing a side stream taken from the recirculating stream to pass through an electrolytic cell removing solids precipitating by the action of said cell, and remixing said treated side stream with the main stream, before feeding them to the cooling tower.

According to a preferred embodiment of the invention the treated side stream leaving the electrolytic cell is further filtered to remove carried over solids. A preferred filter for this purpose is a sand filter with backwash, but of course other suitable filters will be recognized by the skilled engineer.

All the above and other characteristics and advantages of the invention will be better understood through the following illustrative and non-limitative description of preferred embodiments thereof.

DETAILED DESCRIPTION OF PREFERRED EMBODIMENTS

Figure 1:
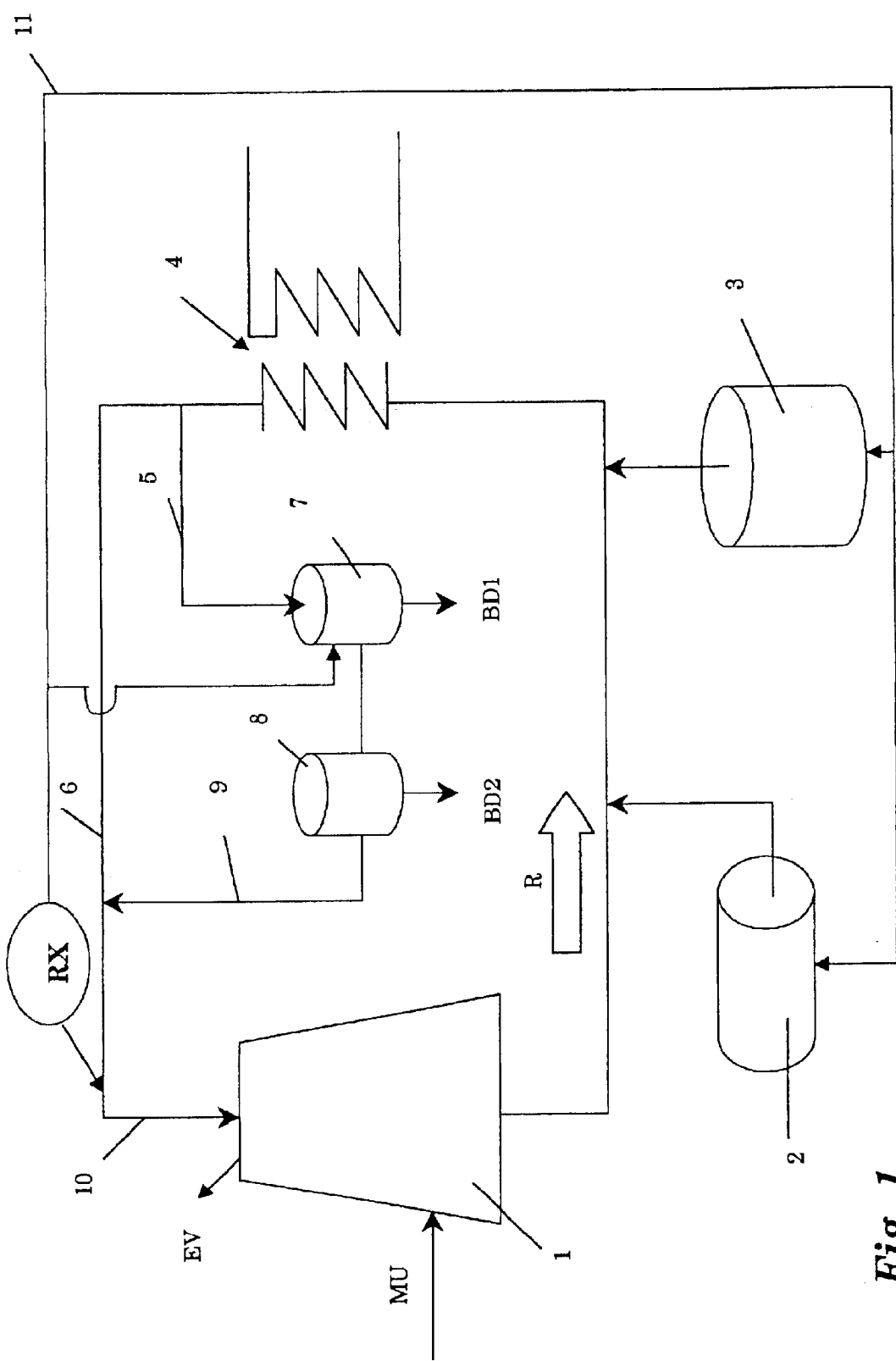
FIG. 1 schematically shows a cooling tower arrangement according to a preferred embodiment of the invention.

The invention will now be illustrated with reference to FIG. 1. Specific operational data will be provided below, for the purpose of illustration, it being understood that any values are given as exemplary values, in order to better illustrate the invention, but the invention is of course not limited to any particular operating conditions. In the figure, numeral 1 indicates the cooling tower, which operates with a make-up feed, MU, which in the example is 15 m$^3$/hr. The MU stream may contain a high content of organic contaminants, such as a stream having a chemical oxygen demand (COD) of about 500–1000 ppm. It should also be noted that the COD may, at peak values, exceed 2000 ppm. When the COD increases, it is desirable to employ non-oxidizing biocides, e.g., chlorinated phenol, to assist in reducing and preventing biofouling. This, as will be apparent to the skilled person, is a concentration by far higher than acceptable according to the prior art. Still, when operating according to the invention, this high concentration does not constitute a problem, and the cooling tower may handle it without any problem.

The cooling tower of the invention operated, according to this specific example, with a recycle ratio R=1,200 m$^3$/hr. A reservoir 2 contains a solution of hypochlorite (10–12% NaClO, Redox potential=300–400 mV, feed rate up to about 15 lit/hr), and a second reservoir, 3, contains a phenolic or non-oxidizing biocide, e.g., quaternary arines, triazolin, DBNPA (dibromonitrilproprionamide) or MIT (methyl izothiazolinone) which can be added as needed, e.g., when the Redox potential reaches below 200 mV.

It should be noted that the Redox potential range of 300–400 mV is not arbitrary, since above 400 mV corrosion problems begin, and below 300 mV the danger of biofouling becomes substantial.

Water is then passed through a heat exchanger 4, which servers one or more users, and is then sent to the cooling tower. A side stream, 5, which in this specific example is in the range of 100–250 m$^3$/hr, is sent to treatment, while the main stream 6 proceeds to the cooling tower. Side stream 5 is fed first to an electrolytic cell 7, operating at 600 A×10 V, and then to a filter, 8, where precipitates are filtered off. The precipitates are obtained mainly as a result of the electrolytic process in cell 7, which causes scale to precipitate, including salts and organic matter. Electrodeposition of scale on the cathode surface takes place, due to the alkaline environment existing in its vicinity, as well as electro-coagulation and flocculation of dispersed organic and inorganic materials. Of course, the anode causes oxidation and generation of oxychloro compounds, as well as the generation of $O_3$ and OH. in the water, which are by themselves useful biocides, and these species function as biocides in the system.

A bleed is effected in both the electrolytic cell 7 (blow down stream BD1) and in the filter (blow down stream BD2) 30 m$^3$/day, and the treated water, stream 9, is then mixed with the main stream 6. The Redox potential of the mixed stream 10 should usually be in the range of 300–400 mV, but with low CODs lower values, down to 150 mV, can also suffice. Water flowing in the cooling tower is partially evaporated, as schematically indicated by evaporation stream EV. The amount of water evaporated is, in the example given, about 300 m$^3$/day, and must in general be the difference between the make-up stream, MU, and the sum of blow down streams BD1+BD2. "RX" is a Redox potential controller, and 11 is the control circuit for operating the biocides 2 and 3 inlets, e.g., through pumps (not shown).

When operating according to the invention, water in the system is maintained constantly clean, typically having the following parameters: Turbidity<10 NTU; Total Hardness= 400–600 ppm; Ca Hardness=150 ppm; Total Alkalinity= 200–400 ppm; Total Count=10$^3$–10$^5$ IFU/ml, with no sulphate reducing bacteria (SRB), without fungi, molds and yeast.

The water used to provide the make-up stream MU can be of any industrial or urban impure source, and may contain organic contaminants, which are considered as unsuitable for cooling tower water, according to the known art. Of course, the MU stream must be treated, prior to use, to remove undesirable matter therefrom, such as solids or biological matter, e.g., bacteria. The desirable parameters do not exceed COD=20 ppm and total suspended solids (TSS) <20 ppm.

As explained in WO 99/16715, using the electrolytic cells in the water system, under appropriate conditions, achieves a combined effect of scale removing and disinfecting. According to the present invention, however, additional effects, such as electrocoagulation and electroflocculation are also exploited.

An electrolytic cell for the treatment according to the present invention can be, e.g., a unit which comprises a bid container having at least one liquid inlet and one liquid outlet, e.g., a pipe, further comprising at one cathode and one anode placed within said liquid container, said cathode and anode being in electrical contact with the "−" and "+" poles of a direct current source, respectively. Said liquid inlet is connected to stream 5 of FIG. 1, and said liquid outlet is connected to filter 8.

In contrast to the use made in WO 99/16715, in which no chemicals are added, the present invention may require the use of at least hypochlorite. Furthermore, the invention permits to employ water having a conductivity of 3,000 $\mu$S, or higher, up to about 6,000 $\mu$S, without causing any substantial increase in corrosion. A typical pH for operating under these conditions is pH≈8.5–9. In this specification, "$\mu$S" indicates the $\mu$Siemens unit (which equals $\mu\Omega^{-1}$). It should be noted that current standards, in coolig towers employing chemicals, is not greater than 3,000 $\mu$S, and often as low as 2,000 $\mu$S.

The present invention can be carried out by means of any electrolytic cell. An example of such a cell is described, e.g., in Whitten et al., "General Chemistry with a Qualitative Analysis", Saunders College Publishing, $4^{th}$ ed, pp. 12–18.

A water treatment device according to the present invention can be in a form such as that described in WO 99/16715, or any other suitable device. An example of operating conditions for the illustrative cooling tower described above is as follows:

- 6 electrolytic cells with a diameter of 50 cm each and 110 cm height.
- Each cell contains 5 anodes and 5 cathodes, of 10 cm×100 cm each.
- The current (100–110 A)×(8–10 V).
- 10 sand filters with counter-current flush, 90 cm diameter×60 cm
- Counter-current flushing effected every 12 hours with 12–16 m³ of water.
- Heat Output: 1,200 m³/hr×7° C. Operating 4–5° C. above the wet temperature.
- $T_{in}$=35° C.; $T_{out}$=28°C.; $T_{bulk}$=24° C.

The above description and examples have been provided for illustrative purposes only, and are not intended to limit the invention in any way. It will be apparent to the skilled person that many modifications, variations and adaptations may be made to the invention by persons skilled in the art, without departing from the spirit of the invention or exceeding the scope of the claims.

What is claimed is:

1. A method of operating a cooling tower, comprising feeding to said cooling tower a make-up stream of water containing organic and/or biological contaminants, causing a side stream taken from a recirculating stream to pass through an electrolytic cell that performs oxidation/reduction reactions using DC electrical current for decomposing water and generating chlorine, removing solids precipitated by the action of said cell, and remixing said treated side stream with the main stream, before feeding them to said cooling tower, further comprising adding a non-oxidizing biocide to the re-circulating stream as an aid in the prevention of biofouling.

2. A method according to claim 1, wherein the biocide is added when the Redox potential decreases to a value of about 200 mV or less.

3. A method according to claim 1, wherein the biocide is selected from among phenolic biocides, quaternary amines, triazolin, DBNPA (dibromonitrilproprionamide), MIT (methyl izothiazolinone) or MBT.

4. A method of operating a cooling tower, comprising feeding to said cooling tower a make-up stream of water containing organic and/or biological contaminants, causing a side stream taken from the recirculating stream to pass through an electrolytic cell which performs oxidation/reduction reactions using DC electrical current for decomposing water and generating chlorine, removing solids precipitating by the action of said cell, and remixing said treated side stream with the main stream, before feeding them to the cooling tower and further comprising adding a non-oxidizing biocide to the re-circulating stream as an aid in the prevention of biofouling.

5. A method according to claim 4, wherein the biocide is added when the Redox potential decreases to a value of about 200 mV or less.

6. A method according to claim 4, wherein the biocide is selected from among phenolic biocides, quaternary amines, triazolin, DBNPA (dibromonitrilproprionamide), MIT (methyl izothiazolinone) or MBT.

* * * * *